Oct. 22, 1957　　　　C. WANTZ　　　　2,810,525
CONTROL DEVICE FOR FLUID FUEL BURNERS
Filed Aug. 31, 1953　　　　　　　　　　3 Sheets-Sheet 1

INVENTOR.
Clarence Wantz.
BY
HIS ATTORNEY

Oct. 22, 1957 C. WANTZ 2,810,525
CONTROL DEVICE FOR FLUID FUEL BURNERS
Filed Aug. 31, 1953 3 Sheets-Sheet 2
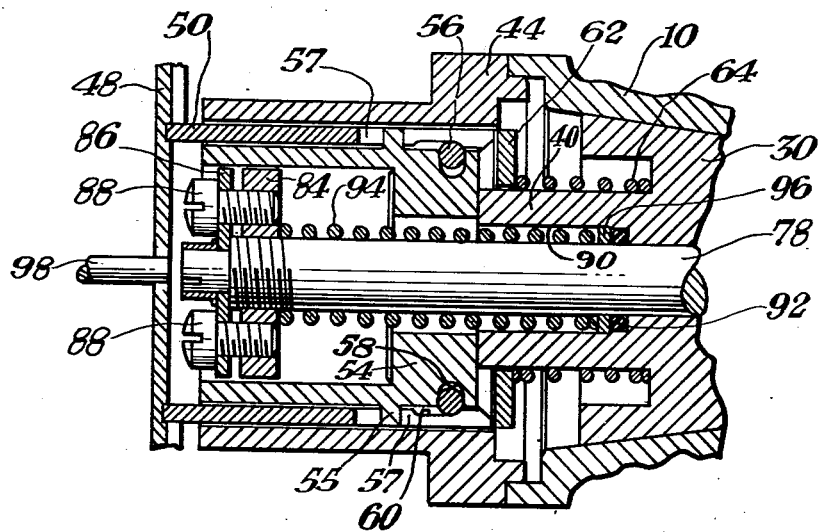
Fig. 2.
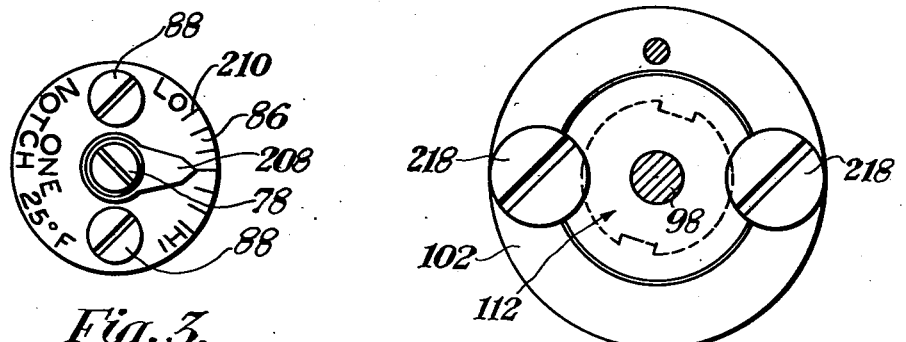
Fig. 3.
Fig. 4.
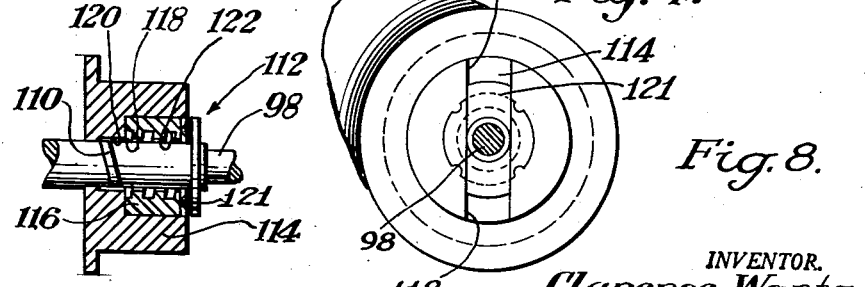
Fig. 5.
Fig. 8.
INVENTOR.
Clarence Wantz.
BY
HIS ATTORNEY Oct. 22, 1957 C. WANTZ 2,810,525
CONTROL DEVICE FOR FLUID FUEL BURNERS
Filed Aug. 31, 1953 3 Sheets-Sheet 3

INVENTOR.
Clarence Wantz.
BY
HIS ATTORNEY

United States Patent Office 2,810,525
Patented Oct. 22, 1957

2,810,525

CONTROL DEVICE FOR FLUID FUEL BURNERS

Clarence Wantz, Los Angeles, Calif.

Application August 31, 1953, Serial No. 377,316

21 Claims. (Cl. 236—46)

This invention relates to control devices for fluid fuel burning appliances and more particularly to combined valves controlled by manually operable means, thermostatic means and timing means respectively.

One object of this invention is to arrange a thermostatic valve, a timing valve and a gas cock within a single casing.

Another object of this invention is to utilize a common element for actuating the timing valve and adjusting the thermostatic element.

Another object of this invention is to permit independent operation of the timer controlled valve and the thermostatically controlled valve.

Another object of this invention is to permit removal of the timer without disturbing other parts of the control.

Another object of this invention is to arrange the parts compactly while insuring ready access for servicing.

Another object of the invention is to prevent accidental shocks and blows on exposed portions of the device from causing damage to control mechanisms therein.

This invention finds particular utility in a combined timed valve and gas cock and, in such an application, an object of the invention is to prevent accidental opening of the gas cock while insuring quick release of the locking mechanism when operation is desired.

Another object of the invention is to maintain a substantially constant bias on the gas cock to prevent excessive pressures on the tapered seating surfaces thereof by isolating the timer valve biasing forces from the gas cock biasing forces.

In a preferred embodiment of the invention, a gas cock, timer valve, and thermostatically controlled valve are located in axial alignment with each other within a single casing. A handle or knob carried by the gas cock is operatively connected to the thermostatically controlled valve for adjusting the same and contains a timer unit operatively connected to the timer valve.

The handle or knob carried by the gas cock for actuating the same contains a timer unit operatively connected to the timer valve. The knob is provided with a pair of oppositely disposed recesses separated by a partition and a movable element for actuating the timer valve extends therethrough. One end of the movable element carries a handle disposed in one recess and the other end thereof extends through the timing device disposed in the other recess while the partition supports detent means effective to hold the movable element and timer valve in a selected position.

Other objects and advantages will appear from the following specification taken in connection with the accompanying drawings wherein:

Fig. 2 is a fragmentary sectional view taken on the line II—II of Fig. 1;

Fig. 3 is a fragmentary sectional view taken on the line III—III of Fig. 1;

Fig. 4 is a fragmentary sectional view taken on the line IV—IV of Fig. 1;

Fig. 5 is a fragmentary sectional view taken on the line V—V of Fig. 1;

Fig. 8 is a section taken on the lines VIII—VIII of Fig. 1.

Figure 1:
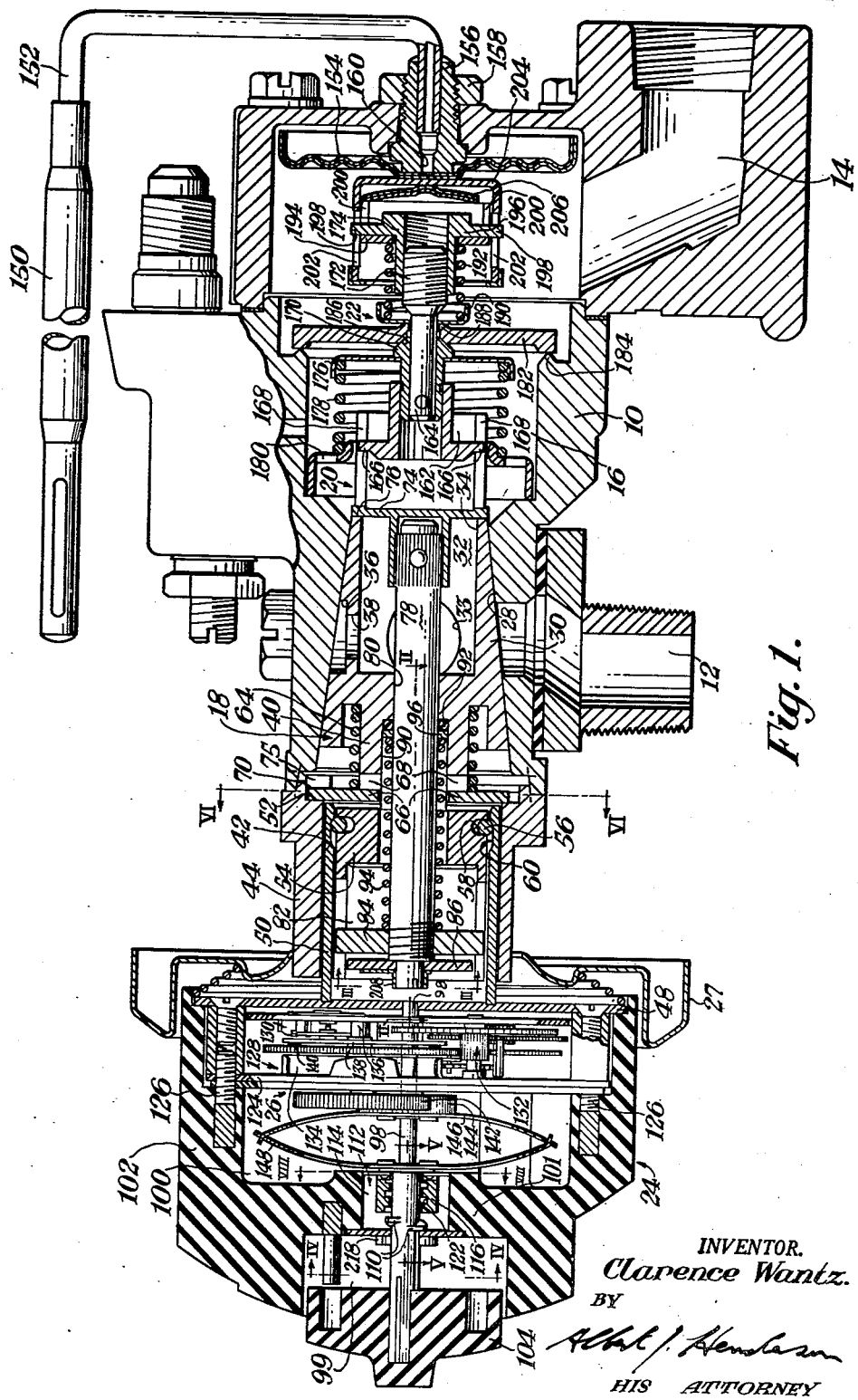
Fig. 1 is a longitudinal sectional view of a control device embodying this invention.

Referring more particularly to the drawings, the control device is shown as comprising a casing 10 provided with an inlet 12 and an outlet 14 communicating with a chamber 16 formed in the casing 10. The chamber 16 forms a passage for conveying fluid fuel from the inlet 12 to the outlet 14 and contains a plug valve 18, a timer valve 20 and a thermostatic valve 22 each of which is effective for controlling fuel flow from the inlet 12 to the outlet 14 independently of the other.

The plug valve 18 is operatively connected to a knob 24 which contains a timing device 26 in turn operatively connected to the timer valve 20. The knob 24 is imprinted with suitable indicia 25 indicating degrees of temperatures adapted for registry with a reference point (not shown) on a bezel 27 for indicating the setting of the thermostatic valve 22.

The plug valve 18 comprises a tapered valve seat 28 formed on the casing 10 in the chamber 16 and adapted to be engaged by the seating surface of a plug valve member 30. The plug valve member 30 is provided with an angular passage 32 comprising an axial passage and communicating radial passage having an inlet 33 adapted to register with the inlet passage 12 in one angular position of the plug valve member 30. The angular passage 32 is also provided with an outlet 34 which communicates with the chamber 16 in all positions of the plug valve member 30. To permit passage of gas from the inlet 12 to the chamber 16 in other positions of the plug valve member 30, an arcuate groove 36 is formed in the plug valve member 30 and is connected to the inlet 33 of the angular passage. To facilitate the passage of gas from the groove 36 to the chamber 16 through the passage 32, two additional ports 38 (only one of which is shown) may be formed in the plug valve member 30 to connect the arcuate groove 36 with the passage 32.

As is customary in gas cocks of this type the plug valve member 30 includes an imperforate seating portion adapted to register with the casing inlet 12 in one angular position of the plug member 30 to prevent fluid flow to the passage 34 from the casing inlet 12.

An axially projecting portion of the valve member 30 forms a valve stem 40 extending through an opening 42 in a cover 44, the wall of the opening being spaced from the valve stem. The cover is secured to the casing 10 by a pair of bolts 46 and is adapted to project through the front panel of a gas range or the like.

The knob 24 for rotating the plug valve member 30 includes a plate 48 carrying a tubular projection 50 which slides within the opening 42 and terminates adjacent an annular recess 52 formed in one end of the cover 44 concentric with the opening 42. A sleeve 54 is interposed between the tubular projection 50 and the valve stem 40 and is rigidly secured to the valve stem 40 in spaced relation with the end of the plug member 30. The tubular projection 50 is slidably keyed to the sleeve 54 by means of a pair of tangs 55 which extend from the sleeve 54 into suitable slots 57 formed in the projection 50.

Axial movement of the tubular projection 50 relative to the sleeve 54 is limited by the provision of a spring ring 56 disposed in an annular groove 58 formed in the sleeve 54. The spring ring 56 is held under radial compression by the tubular projection 50 and extends into an annular groove 60 formed in the inner surface of the tubular projection 50. The axial length of the annular groove 60 is sufficient to permit limited axial movement of the tubular projection 50 with engagement of the spring ring 56 with the end walls of the annular recess 60 defining the limits of such axial movement.

Means is provided for locking the plug valve member 30 in fluid flow preventing position with axial movement of the tubular projection 50 being effective to unlock the same. This means may take the form of a generally annular locking plate 62 mounted on the valve stem 40 between the sleeve 50 and the plug valve member 30.

Figure 6:
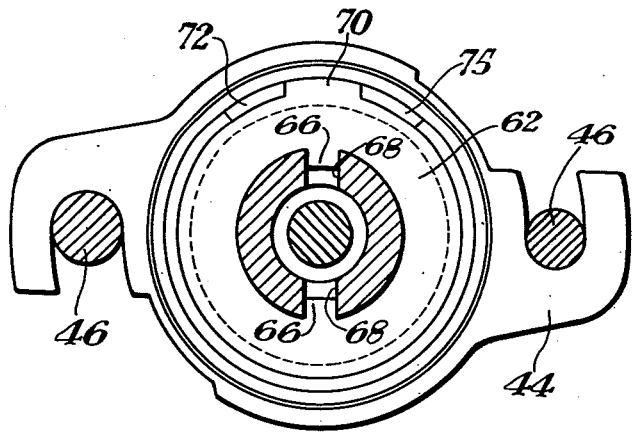
Fig. 6 is a sectional view taken on the line VI—VI of Fig. 1.

The locking plate 62 is slidable on the valve stem 40 and is biased into engagement with the cover 44 by a spring 64 seated on the valve element 30, the spring 64 thus serving to hold the plug member 30 on its seat 28. As best shown in Fig. 6, rotational movement of the locking plate 62 relative to the valve stem 40 is prevented by a pair of oppositely disposed lugs 66 which extend into a pair of oppositely disposed slots 68 formed in the valve stem 40.

The locking plate 62 is also provided with a radially outward extending lug 70 which is disposed within the recess 52 formed in the cover 44. The recess 52 is provided with a cam surface 72 and a limit stop 75 in the form of projections thereon and spaced one from the other to accommodate the lug 70 therebetween. The crest of the cam surface 72 is adjacent the space for the lug 70 whereby the latter may ride up and drop into the space when the valve stem 40 is rotated in a clockwise direction as viewed in Fig. 6. Preferably the limit stop 75 is of such height as to extend into sufficiently close proximity to the casing 10 to prevent the lug 70 from passing therebetween and continuing the clockwise rotation.

In operation, the lug 70 is disposed between the cam surface 72 and the limit stop 75 when the plug valve member 30 is in its fluid flow preventing position. To rotate the plug member 30 to a fluid flow permitting position, the knob 24 is depressed to move the tubular projection 50 into engagement with the locking plate 62 to thereby move the same against the bias of the spring 64 to a position where it will clear the cam surface 72. The knob 24 may then be rotated in a clockwise direction to transmit torque to the valve member 30 through the tubular projection 50, sleeve 54, and valve stem 40. When the knob 24 is so moved, the lug 70 of the locking plate 62 will ride along the cam surface 72 with further rotation of the knob being uninhibited until the lug 70 abuts the limit stop 75.

The timer valve 20 comprises a valve element 74 disposed within the chamber 16 and movable relative to an annular valve seat 76 formed on the end of the plug valve member 30. The valve seat 76 surrounds the outlet 34 of the angular passage 32 so that engagement thereof by the valve element 74 is effective to prevent fluid flow through the passage 32.

The valve element 74 is mounted on one end of a valve stem 78 which is slidably mounted in an axially extending bore 80 formed in the valve stem 40, the other end of the valve stem 78 extending out of the plug stem 40 and being disposed within a recess 82 formed in the sleeve 54.

The valve stem 78 is axially movable relative to the valve stem 40 but is restrained from rotational movement relative thereto by a collar 84 clamped on the valve stem 78 and keyed to the sleeve 54. The collar 84 is threaded on the valve stem 78 and is adapted to be locked in a predetermined angular position relative thereto by clamping means. Such means is here shown as a second collar 86 rotatably mounted on a reduced end portion of the valve stem 78 and connected to the collar 84 by a pair of screws 88. The screws 88 extend through suitable apertures formed in the collar 86 and are threaded into the collar 84 to effect a locking of the collar 84 on the threaded portion of the valve stem 78 when the screws 88 are drawn up. The function of this locking arrangement will be brought out more fully hereinafter with reference to calibration of the thermostatic valve unit 22.

The bore 80, formed in the valve stem 40, is provided with a counterbore 90 in which is positioned an annular sealing element 92. The sealing element 92 encompasses the valve stem 78 and is held in sealing engagement therewith by a spring 94 acting between the collar 84 and a washer 96 positioned in the counterbore 90 in abutting relationship with the sealing element 92. The spring 94 also biases the valve stem 78 to the left as viewed in Fig. 1 and thus biases the valve element 74 toward its seat 76.

It will be apparent that the forces exerted by the spring 94 will, at all times, be confined within the assembly of the plug member 30 and the valve stem 40 and will not serve to urge the plug member 30 toward the seat 28. It will be apparent that the forces are so confined even when an operative connection is established between the knob 24 and the valve stem 78 because of the fact that the lock plate 62 and tubular projection 50 are not connected to each other. Consequently, the biasing force exerted by the spring 64 and urging the plug member 30 into engagement with its tapered seat 28 remains substantially constant, the spring 94 being ineffective to add to such biasing force and the danger of excessive pressures between the tapered seating surfaces being eliminated.

Means for moving the valve member 74 relative to the valve seat 76 is provided and is here shown as including a movable element operatively engageable with the valve stem 78. The movable element comprises a shaft 98 which extends slidably through the plate 48 of the knob 24 with one end thereof juxtaposed the outer end of the valve stem 78.

The knob 24 takes the form of a housing 102 having an outer configuration adapted to be grasped by the hand of a user for manual manipulation. The housing 102 is provided with a pair of oppositely disposed recesses 90, 100 separated by a partition 101. The plate 48 is secured to the housing 102 in a position to close the recess 100 and thus form an enclosed chamber within the housing 102 through which the shaft 98 extends, the shaft being free to rotate and move axially relative to the housing 102.

The other end of the shaft 98 extends through the partition 101 of the housing 102 and projects into the recess 99. Secured to the end of the shaft 98 which extends into the recess 99, is a manually operable handle or knob 104 for actuating the shaft 98. The knob 104 is positioned substantially within the recess 99, and will be protected from extraneous impacts which would tend to distort the shaft 98.

The spring 94 biases the valve stem 78 toward the shaft 98. However, the shaft 98 may be moved into engagement with the valve stem 78 to move the same against the bias of the spring 94 to unseat the valve member 74 by manual manipulation of the knob 104. Suitable indicia 106 indicating units of time are imprinted on the housing 102 of the knob 24 for registry with a reference mark 108 on the knob 104 for a purpose which will more fully appear hereinafter.

Abutment means is carried by the shaft 98 and to this end, there is formed, on the medial portion of the shaft 98, a pair of oppositely disposed partial turns 110 of a double external thread. The threads 110 are milled or ground off to form a substantially rectangular cross-section at the threads for a purpose which will more fully appear.

A relatively stationary detent member includes a pair of helical bearing surfaces engageable with the abutment means carried by the shaft 98 for preventing axial movement thereof and comprises a nut assembly 112 secured to the inside of the housing 102. The nut assembly 112 is made up of two axially bored elements 114, 116 coaxially arranged and secured to the housing 102 by screws 218. Formed in the contiguous faces of the elements 114, 116 are registering recesses 118, 120 of generally rectangular cross-section which are adapted to slidably receive the milled threads 110. The element 116 is held within the element 114 by means of a retainer 121 inserted in the end of the element 114.

A double internal thread 122 is formed in the axial bore of the element 116, the pitch of the internal threads 122 being the same as the pitch of the threads 110 formed on the shaft 98. The depth of the recess 118 is such that the full width of the thread cavity of the internal thread 122 forms an opening in the wall thereof. The shaft 98 fits snugly in the axial bores of the elements 114, 116 so that axial movement of the shaft 98 is limited by engagement of the threads 110 with the elements 114, 116.

The position of the valve stem 78 relative to the shaft 98 is such that when the threads 110 on the shaft 98 are positioned within the recess 120 in the element 114, the spring 94 will hold the valve element 74 in its biased or closed position in engagement with the valve seat 76. However, when the shaft 98 is moved axially to move the threads 110 into engagement with the internal threads 122 formed in the element 116, the valve stem 78 is moved against the bias of the spring 94 to space the valve element 74 from the valve seat 76, thereby permitting fuel flow through the angular passage 32 in the plug valve member 30. If the shaft 98 is rotated after it has moved the valve element 74 to open position, the external threads 110 will become interengaged with the internal threads 122 and the valve element 74 will be retained in its open position.

It will be apparent that the axial thrust exerted on the valve stem 78 by the spring 94 will be transmitted directly to the shaft 98 in the open position of the valve member 74 and to the threads 110. Since the bearing surfaces of the threads 110 are disposed at an angle to the line of action of this force, a portion of the force will be transformed to torque and will tend to unscrew the shaft 98 from the element 116. However, the internal threads 122 will exert a reactive force on the threads 110, a portion of which will comprise a torsional component acting in a direction to resist such unscrewing action in the shaft 98.

Means is provided for applying a control force to the shaft 98 to control release of the movable operating shaft 98 from the detent element 116. This means comprises the timing device 26 which takes the form of an escapement controlled clock movement. The timing device is disposed within the chamber 100 in the housing 102 and is carried on a base plate 124 secured to the housing 102 by a plurality of screws 126.

The timing device 26 includes a mainspring assembly 128 geared to an escapement mechanism 130 by a gear train 132. The mainspring assembly includes a spirally wound spring 134 which lies in a plane substantially parallel to the base plate 124 and is secured at its outer end to the base plate 124 and at its inner end to a rotatable arbor 136. Mounted on the arbor 136 for rotation therewith is one element 138 of a friction clutch disposed in frictional torque transmitting relation with a mainspring gear 140 which is mounted on the arbor 136 for rotation relative thereto. One end of the arbor 136 extends through the base plate 124 and carries a gear 142 which meshes with a pinion 144 loosely mounted on the shaft 98.

The connection between the pinion 144 and the shaft 98 is such that the shaft 98 may move axially relative to the pinion 144 while maintaining a torque transmitting relation therewith. This connection is here shown as comprising a first leaf spring 146 secured at its medial portion to the pinion 144 and a second leaf spring 148 secured at its medial portion to the shaft 98. The juxtaposed ends of the leaf springs 146, 148 are interlocked so that rotational movement will be transmitted between the pinion 144 and shaft 98 but, upon axial movement of the shaft 98, the springs 146, 148 will flex causing no axial displacement of the pinion 144.

The hereinbefore described timer and detent mechanism is disclosed in detail and claimed in my copending application, Serial No. 323,686, filed December 2, 1952, now Patent No. 2,778,419.

The thermostatically controlled valve unit 22 for the embodiment herein disclosed comprises a bulb 150, which is adapted to be located in a space to be heated, and tube 152 operatively connected to an expansible and contractible power element 154 housed within the casing 10. In this instance, the end of the tube 152 adjacent the power element 154 is secured in sealing engagement with a stud 156 which projects from the casing 10 and is secured thereto by means of a nut 158. The inner end of the stud 156 abuts the power element 154 and is provided with an aperture 160 affording communication between the tube 152 and the interior of the power element. The control assembly comprising the bulb 150, tube 152, and power element 154 is filled with a liquid which, upon changes in temperature sensed by the bulb 150, will serve to expand and contract the power element 154 as is well known to those skilled in the art.

The timer valve member 74 is provided with an axially extending cylindrical projection 162 formed to receive the end of a valve shaft 164 which is adapted for longitudinal movement therein, being prevented from rotation relative to the valve member 74 by means of a pair of oppositely disposed tangs 166 projecting therefrom into engagement with a pair of slots 168 formed in the cylindrical projection 162.

The valve shaft 164 is provided, intermediate its ends, with an enlarged portion 170 having a tapered face formed on one side thereof. The end 172 which projects beyond the enlargement 170 is threaded into a thimble 174.

The shoulder formed by the enlarged portion 170 is designed to afford an abutment for an annular spring seat 176. A coil spring 178 engages, at one end, with the spring seat 176 and the other end abuts a spider 180 which is seated on the casing 10.

Communication through the chamber 16 between the timer valve device 20 and the outlet passage 14 is controlled by a valve member 182 which is loosely mounted on the valve shaft 164 between the enlarged portion 170 and the threaded end 172 and is adapted to engage a valve seat 184 formed on the casing 10. Engagement of the valve member 182 with the valve shaft 164 is effected by the provision of a centrally located tapered seat 186 on the valve member 182 which seat is preferably ground and lapped into sealing engagement with the tapered face of the enlarged portion 170.

It will be apparent that movement of the power element 154, when undergoing expansion, is toward the left as viewed in Fig. 1 and that seating movement of the valve member 182 is also in this direction. Hence, the valve member 182 and the power element 154 work in opposition to each other due to the fact that the expansive movement of the power element 154 is in a direction tending to force the valve member 182 against the bias of the spring 178 and toward the valve seat 184.

To prevent damage to the valve member 182 upon excessive expansion of the power element 154, the valve member 182 is provided on the side opposite the tapered seat 186 with a raised boss 188 forming an abutment for a cup-shaped washer 190 loosely mounted on the shaft 164 adjacent the valve mebber 182. One end of a coil spring 192 abuts the washer 190 and the other end thereof engages the bottom exterior surface of a cup-shaped element 194 which is fitted over a flange 196 formed on the thimble 174.

A pair of radially extending lugs 198 are formed on the flange 196 to extend through suitable slots 200 formed in the cup-shaped element 194 and into apertures 202 formed in the walls of a second cup-shaped element 204. The cup-shaped element 204 is secured to the power element 154 by welding or the like so that engagement thereof with the lugs 198 prevents rotation of the thimble 174 relative to the casing 10. The apertures 202 are elongated in form to permit longitudinal movement of the thimble 174 while preventing rotation thereof.

Bottomed in the cup-shaped element 204 is a bi-metallic disk 206 which also engages the cup-shaped element 200. Thus, forces are transmitted from the power element 154 through the cup-shaped element 204, bi-metallic disk 206, cup-shaped element 200, spring 192 and valve shaft 164 to the valve member 182, the bi-metallic disk 206 serving to compensate for variations in ambient temperatures in a manner well-known in the art.

In the operation of the device, the knob 24 is depressed to release the locking plate 62 and is rotated to any desired temperature setting indicated by the indicia 25. This rotation will move the plug valve member 30 to a fluid flow permitting position and will transmit torque through the valve stem 78, valve member 74, and the cylindrical projection 162 on the valve member 74, to the valve shaft 164 thus serving to move the threaded thimble 174 to the left as viewed in Fig. 1 and permitting the spring 178 to move the valve member 182 away from its seat. The valve member 182 will remain unseated until the temperature sensed by the bulb 150 causes the power element 154 to expand and move the valve member 182 toward its seat.

Although rotation of the knob 24 will cause opening of the plug valve 18 and thermostatically controlled valve 22, fluid flow from the inlet 12 to the outlet 14 will be prevented by the valve member 74 until the same is moved away from its seat by manual manipulation of the timer knob 104.

To move the valve member 74 away from its seat 76, the knob 104 is depressed to move the shaft 98 axially, carrying the threads 110 out of the recess 120, where rotation thereof is prevented, and into engagement with the internal threads 122. Such movement of the shaft 98 will impart axial movement to the valve stem 78, moving the same against the bias of the spring 94 and positioning the valve element 74 away from the valve seat 76. Fluid may then flow past the valve member 74 to the outlet 14 of the casing 10.

Figure 7:
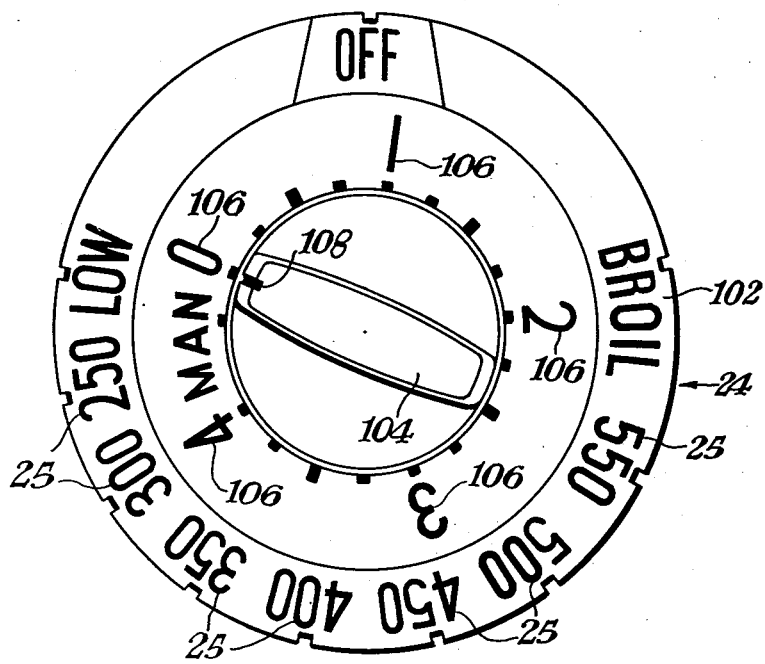
Fig. 7 is an end view of the device shown in Fig. 1.

The knob 104 is then rotated in a clockwise direction as viewed in Fig. 7 to a desired time setting indicated by the indicia 106 and the reference mark 108. Rotational movement of the knob 104 rotates the shaft 98 to screw the threads 110 into the internal threads 122. The shaft 98 will therefore remain in the position in which it has been set unless torque is applied thereto to start rotation of the same and screw the threads 110 out of the threads 122.

It will be understood that the sequence of rotational setting movements of the knob 24 and the knob 104 may be reversed if desired with setting of the timer knob 104 preceding operation of the plug valve actuating and temperature adjusting knob 24.

The rotational setting movement of the knob 104 also rotates the pinion 144 which drives the gear 142 and winds the main spring 134 of the timer movement 26. The gear 140 tends to rotate with the gear 142 because of the frictional connection therebetween but is prevented from doing so by the timer gear train 132 and escapement 130. Slippage therefore occurs between the gears 142 and 140. However, when the knob 104 is released, the torque of the mainspring 134 is transmitted directly to the gear 140 and frictionally to the gear 142. Since the frictional torque between gears 140 and 142 is greater than the maximum torque of the mainspring 134, the mainspring torque will cause common rotation of the gears 140 and 142 as a unit. This rotation of gears 140 and 142 will drive the gear train 132 and the pinion 144, the escapement 130 controlling the speed of rotation and the pinion 144 causing return rotation of the shaft 98 and knob 104 to their initial angular positions.

When the mainspring 134 has rotated the shaft 98 to the initial angular position, the threads 110 are disengaged from the threads 122 and, since the threads 110 are then aligned with the recess 120, the shaft 98 will be moved rapidly to the left as viewed in Fig. 1 until the threads 110 engage the bottom of the recess 120. Simultaneously, with this axial movement of the shaft 98, the valve member 74 will move into engagement with its seat 76 with a snap action to prevent further flow of fluid to the outlet 14 of the casing 10.

When the milled threads 110 move into the recess 120, the flat sides of the threads parallel the side walls of the recess 120 and further rotation of the shaft 98 is prevented. The timer movement 26 will then stall and further unwinding of the mainspring 134 is prevented. Thus, the mainspring 134 will never be permitted to run down and a substantial torque may be exerted thereby on the shaft 98 in all angular positions of the shaft to eliminate danger of insufficient winding of the mainspring when the timer is set to operate at a small time interval.

If it is desired to eliminate control of fluid flow by the timer 26, the knob 104 is depressed to move the threads 110 into engagement with the threads 122 and it is then rotated in a direction opposite to the time setting direction to wedge the external threads 110 in the thread cavity at its junction with the recessed element 114. Any operation of the timer movement 26 will then tend to force the threads 110 further into the cavity and the shaft 98 will be maintained in its depressed position to thereby hold the valve element 74 away from its valve seat 76.

It will be apparent from the foregoing that the valve stem 78 serves the dual function of transmitting axial movement between the timing device 26 and the valve member 74 and transmitting torque from the knob 24 to the temperature adjusting mechanism of the thermostatically controlled valve 22. However, the valve stem 78 also provides means for calibrating the thermostatically controlled valve 22.

To effect calibration of the device, the assembly of the knob 24 and tubular projection 50 is withdrawn to expose the end of the valve stem 78 as viewed in Fig. 3. The screws 88 locking the collar 84 on the threaded end of the valve stem 78 are loosened to free the valve stem 78 for rotation relative to the collar 84. The valve stem 78 can then be rotated relative to the collar 84 by a screw driver or the like to change the relationship between the regulating valve member 182 and the sleeve 54 which is keyed to the knob 24 and governs the position thereof. For convenience, a pointer 208 may be carried on the end of the valve stem 78 to cooperate with indicia 210 on the collar 86 to indicate the number of degrees of alteration which have been made in the temperature at which the calibrated device will operate.

It will be apparent from the foregoing that the illustrated embodiment provides a new and improved control device and accomplishes the objects of the invention. It will also be obvious to those skilled in the art that the illustrated embodiment may be variously changed and modified, or features thereof, singly or collectively embodied in other combinations than those illustrated without departing from the scope of the invention or sacrificing all of the advantages thereof, and that accordingly the disclosure herein is illustrative only and the invention is not limited thereto.

It is claimed and desired to secure by Letters Patent:

1. In a control device, the combination of a casing having fluid passageways intersected by a valve seat, valve means rotatable relative to said seat for controlling flow of fluid in said passageways, second valve means operably associated with the first said valve means and reciprocable for controlling flow of fluid in said passageways, a manually operable knob operatively connected to said first valve means for rotating the same, said knob being provided with a pair of oppositely disposed recesses separated by a partition, an element extending through said partition for axial movement relative thereto and having one end thereof operatively engageable with said second valve means, a manually operable handle disposed in one of said recesses and connected to the other end of said element for reciprocating the same and moving said second valve means between said controlling positions, detent means supported by said partition and cooperable with said element for holding said second valve means in one of said controlling positions, and timer means disposed within the other of said recesses for controlling release of said detent means.

2. A control device as claimed in claim 1 wherein said detent means comprises an annular element defining a helical bearing surface and secured to said partition, said movable element extending through said annular element and being provided with abutment means adapted to engage said surface upon rotation of said handle in one direction and be disengaged from said surface upon rotation of said handle in another direction.

3. A control device as claimed in claim 2 wherein said timer means is operatively connected to said element for controlling the rate of rotation thereof in said other direction.

4. In a control device for fluid fuel burners, the combination comprising a casing having an inlet and an outlet opening, a tapered valve seat in said casing adjacent said inlet, a hollow tapered plug valve member cooperable with said seat for controlling fuel flow between said inlet and outlet openings, said plug valve member having a port adapted to register with said inlet opening and having a stem portion extending from said casing, a cover secured to said casing and extending around said portion, a sleeve slidably interposed between said cover and said portion, means for connecting said sleeve to said portion for limiting said slidable movement and providing a torque transmitting relation therebetween, a latching element mounted on said portion for slidable non-rotatable movement relative thereto independently of said sleeve, yieldable means extending between said plug valve member and said latching element for biasing said element to a first position in latching engagement with said cover and urging said plug valve member to its seat, manually operable means supported by said sleeve for imparting axial and rotational movement thereto to move said latching element to a second position out of latching engagement with said cover and rotate said plug valve member, a second valve seat in said casing adjacent said plug valve member, a second valve member cooperable with said second seat for controlling fluid flow to said outlet passage, a valve stem slidably mounted in said plug valve member and connected to said second valve member, yieldable means operable between said plug valve member and the assembly of said second valve member and said valve stem for biasing said second valve member toward said second seat, and second manually operable means supported by said sleeve for moving said assembly against its bias to set said second valve in a predetermined position relative to said second valve seat.

5. A control device as claimed in claim 4 wherein abutment means is provided on said cover, said latching element being engageable with said abutment means in said first position to prevent rotation of said plug valve member and being free of said abutment means in said second position.

6. A control device as claimed in claim 4 including detent means supported by said sleeve and cooperable with said second manually operable means for holding said second valve member in said predetermined position.

7. A control device as claimed in claim 6 wherein said first manually operable means comprises a hollow handle secured to said sleeve and timing means disposed within said handle is provided for controlling the operation of said detent means.

8. In a control device, the combination comprising a unitary housing adapted to be mounted for rotary and reciprocable motion, said housing being provided with a pair of oppositely disposed recesses separated by a partition, an actuating element extending through said partition and reciprocable between controlling positions, a handle reciprocable in one of said recesses and connected to one end of said actuating element for moving said element between said controlling positions, detent means supported by said partition for holding said actuating element in one of said positions, and timing means disposed wholly within the other of said recesses for controlling the operation of said detent means.

9. A control device as claimed in claim 8 wherein said detent means comprises means defining at least one helical bearing surface fixed relative to said partition, said actuating element being coaxial with said helical surface and being provided with abutment means adapted to engage said surface upon rotation of said handle.

10. A control device as claimed in claim 9 wherein said timing means is operatively connected to said actuating element for controlling the rate of rotation thereof.

11. In a control device for fluid fuel burners, the combination comprising a valve casing having inlet and outlet passages connected through a valve chamber, first valve means in said chamber and movable between controlling positions for controlling fluid flow from said inlet to said outlet, manually operable means for actuating said first valve means, second valve means in said chamber and movable between controlling positions for controlling fluid flow from said inlet to said outlet independently of said first valve means, means including a movable element for actuating said second valve means, timer means for controlling said last named means, third valve means in said chamber and movable between controlling positions for controlling fluid flow from said inlet to said outlet independently of said first and second valve means, means responsive to a temperature condition for actuating said third valve means, adjustable means for setting the temperature to which said last named means will respond, and means including said movable element for adjusting said adjustable means upon operation of said manually operable means.

12. In a control device for fluid fuel burners, the combination comprising a valve casing having inlet and outlet passages connected through a valve chamber, means defining three annular valve seats disposed within said chamber and spaced from each other, a first valve member in said chamber and cooperable with one of said seats for controlling fluid flow from said inlet to said outlet, manually operable means for moving said first valve member relative to said one valve seat, a second valve member in said chamber and cooperable with a second of said seats for controlling fluid flow from said inlet to said outlet independently of said first valve member, actuating means including a movable element for adjusting the relative positions of said second valve member and said second seat, timer means for controlling said last named means, a third valve member in said chamber and cooperable with a third of said valve seats for controlling fluid flow from said inlet to said outlet independently of said first and second valve members, means responsive to a temperature condition for moving said third valve member relative to said third valve seat, adjustable means for setting the temperature to which said last named means will respond, and means including said movable element for adjusting said adjustable means upon operation of said manually operable means.

13. A control device as claimed in claim 12 wherein said adjustable means includes a rotatable member for adjusting the temperature at which said temperature responsive means will move said third valve member into engagement with said third valve seat, said movable element being operatively connected to said second valve member for imparting axial movement thereto and being operatively connected to said rotatable member for imparting rotary movement thereto.

14. In a control device for fluid fuel burners, the combination comprising a valve casing having inlet and outlet passages connected through a valve chamber, a rotatable plug valve member seated in said chamber for controlling fluid flow from said inlet to said outlet and having a stem portion projecting from said casing, manually operable means cooperable with said portion for rotating said plug valve member, an annular valve seat in said casing adjacent the inner end of said plug valve member, a poppet valve member movable relative to said seat for controlling fluid flow from said inlet to said outlet independently of said plug valve member, a valve stem connected to said poppet valve member for moving the same relative to said seat and slidably mounted in said plug valve member for rotation therewith, thermostatic valve means in said chamber adjacent said poppet valve member for controlling fluid flow from said inlet to said outlet, means including a rotatable member for setting the temperature to which said thermostatic valve means will respond, and means defining a torque transmitting connection between said valve stem and said rotatable temperature setting member.

15. In a control device for fluid fuel burners, the combination comprising a valve casing having inlet and outlet passages connected through a valve chamber, a rotatable plug valve member seated in said chamber for controlling fluid flow from said inlet to said outlet and having an outer stem portion projecting from said casing, manually operable means cooperable with said portion for rotating said plug valve member, an annular valve seat in said casing adjacent the inner end of said plug valve member, a poppet valve member movable relative to said seat for controlling fluid flow from said inlet to said outlet, a valve stem connected to said poppet valve member for moving the same and slidably mounted in said plug valve member for rotation therewith, means for biasing said poppet valve member to a first controlling position, manually operable means cooperable with said valve stem for moving said poppet valve member against said bias to a second controlling position, detent means for holding said poppet valve member in said second position, timer means for controlling the release of said detent means to free said poppet valve member for movement under said bias to said first position, thermostatic valve means in said chamber adjacent said poppet valve member for controlling fluid flow from said inlet to said outlet, means including a rotatable member for setting the temperature to which said thermostatic valve means will respond, and means defining a torque transmitting connection between said valve stem and said rotatable temperature setting member.

16. A control device as claimed in claim 15 wherein said first mentioned manually operable means comprises a hollow handle operatively connected to said projecting portion, said timer means including a timing device disposed within said hollow handle.

17. A control device as claimed in claim 16 wherein said second manually operable means includes a movable element mounted in said handle and engageable with said valve stem, said detent means being disposed within said handle and being engageable with said movable element.

18. A control device as claimed in claim 17 wherein said detent means comprises a threaded element mounted on said handle and a threaded portion on said movable element interengageable with the threads of said threaded element, said timer means being operatively connected to said movable element to control the rate of rotation thereof and thereby control the period during which said threads and threaded portion will be interengaged.

19. In a control device for fluid fuel burners, the combination comprising a valve casing having inlet and outlet passages connected through a valve chamber, a rotatable plug valve member seated in said chamber for controlling fluid flow from said inlet to said outlet and having an outer stem portion projecting from said casing, manually operable means cooperable with said portion for rotating said plug valve member, an annular valve seat in said casing adjacent the inner end of said plug valve member, a valve stem slidably mounted in said plug valve member for rotation therewith, a poppet valve member secured to said valve stem for axial and angular movement therewith, said poppet valve member being cooperable with said annular valve seat for controlling fuel flow from said inlet to said outlet, means for imparting axial movement to said valve stem, thermostatic valve means in said chamber adjacent said poppet valve member, means including a rotatable member for setting the temperature to which said thermostatic valve means will respond, and means defining a slidable torque transmitting connection between said poppet valve member and said rotatable temperature setting member for adjusting said temperature setting member upon operation of said manually operable means.

20. In a control device for fluid fuel burners, the combination comprising a valve casing having inlet and outlet passages connected through a valve chamber, a rotatable plug valve member seated in said chamber for controlling fluid flow from said inlet to said outlet and having an outer stem portion projecting from said casing, manually operable means cooperable with said portion for rotating said plug valve member, an annular valve seat in said casing adjacent the inner end of said plug valve member, a valve stem slidably mounted in said plug valve member, adjustable means for maintaining said valve stem and said plug valve member in selected angular positions relative to each other, a poppet valve member secured to said valve stem for axial and angular movement therewith and cooperable with said annular valve seat for controlling fuel flow from said inlet to said outlet, means for imparting axial movement to said valve stem, thermostatic valve means in said chamber adjacent said poppet valve member, means including a rotatable member for setting the temperature to which said thermostatic valve means will respond, and means defining a torque transmitting connection between said poppet valve member and said rotatable member for adjusting said temperature setting member upon operation of said manually operable means.

21. A control device as claimed in claim 20 wherein said adjustable means comprises an element having slidable torque transmitting engagement with said projecting portion of said plug valve member, and means for releasably clamping said element to said valve stem.

References Cited in the file of this patent

UNITED STATES PATENTS

| | | |
|---|---|---|
| 749,910 | Walter | Jan. 19, 1904 |
| 1,504,068 | Meacham | Aug. 5, 1924 |
| 1,896,904 | Laven | Feb. 7, 1933 |
| 2,302,407 | Waddell | Nov. 17, 1942 |
| 2,303,011 | Weber | Nov. 24, 1942 |
| 2,626,661 | McDowell | Jan. 27, 1953 |